US012615246B2

(12) United States Patent
Prabaharan et al.

(10) Patent No.: US 12,615,246 B2
(45) Date of Patent: Apr. 28, 2026

(54) SESSION TIMEOUT USING ACCESS TOKEN REFRESH

(71) Applicant: Rubrik, Inc., Palo Alto, CA (US)

(72) Inventors: Praveen Kumar Subramanian Prabaharan, Bengaluru (IN); Hao Wu, Mountain View, CA (US); Tanmay Bansal, Bengaluru (IN); Saptarshi Polley, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 206 days.

(21) Appl. No.: 18/307,142

(22) Filed: Apr. 26, 2023

(65) Prior Publication Data

US 2024/0305620 A1     Sep. 12, 2024

(30) Foreign Application Priority Data

Mar. 9, 2023    (IN) .............................. 202311015668

(51) Int. Cl.
*H04L 9/40*          (2022.01)

(52) U.S. Cl.
CPC ........ *H04L 63/0807* (2013.01); *H04L 63/108* (2013.01)

(58) Field of Classification Search
CPC .......................... H04L 63/0807; H04L 63/108
See application file for complete search history.

(56) References Cited

U.S. PATENT DOCUMENTS

| | | | | |
|---|---|---|---|---|
| 9,276,933 | B2 * | 3/2016 | Sng ........................ | H04L 9/3213 |
| 9,948,673 | B2 * | 4/2018 | Jin ......................... | H04W 76/27 |
| 2008/0159318 | A1 * | 7/2008 | Pierlot .................. | G06F 21/335 |
| | | | | 370/412 |
| 2020/0396299 | A1 * | 12/2020 | Mitsov .................. | G06F 9/4843 |
| 2021/0344670 | A1 * | 11/2021 | Dachev ............... | H04L 63/0846 |

OTHER PUBLICATIONS

Improvising JSON Web Token Authentication in SDN, Varalakshmi et al., Mar. 2022 (Year: 2022).*

* cited by examiner

*Primary Examiner* — Jahangir Kabir
(74) *Attorney, Agent, or Firm* — Holland & Hart LLP

(57)          ABSTRACT

Methods, systems, and devices for data management are described. A client may transmit, to a server, a login request for an application. The login request may include authentication parameters associated with a user. The client may receive, from the server, an access token that supports access via a user interface to one or more services associated with the application before expiration of a time-to-live for the access token. The client may transmit, prior to expiration of the time-to-live for the access token and based on a session inactivity timer being active, a refresh request for a new access token. The refresh request may include an indication of the access token. The application may receive the new access token in response to the refresh request, and the new access token supports access to the one or more services before expiration of a time-to-live for the new access token.

14 Claims, 11 Drawing Sheets

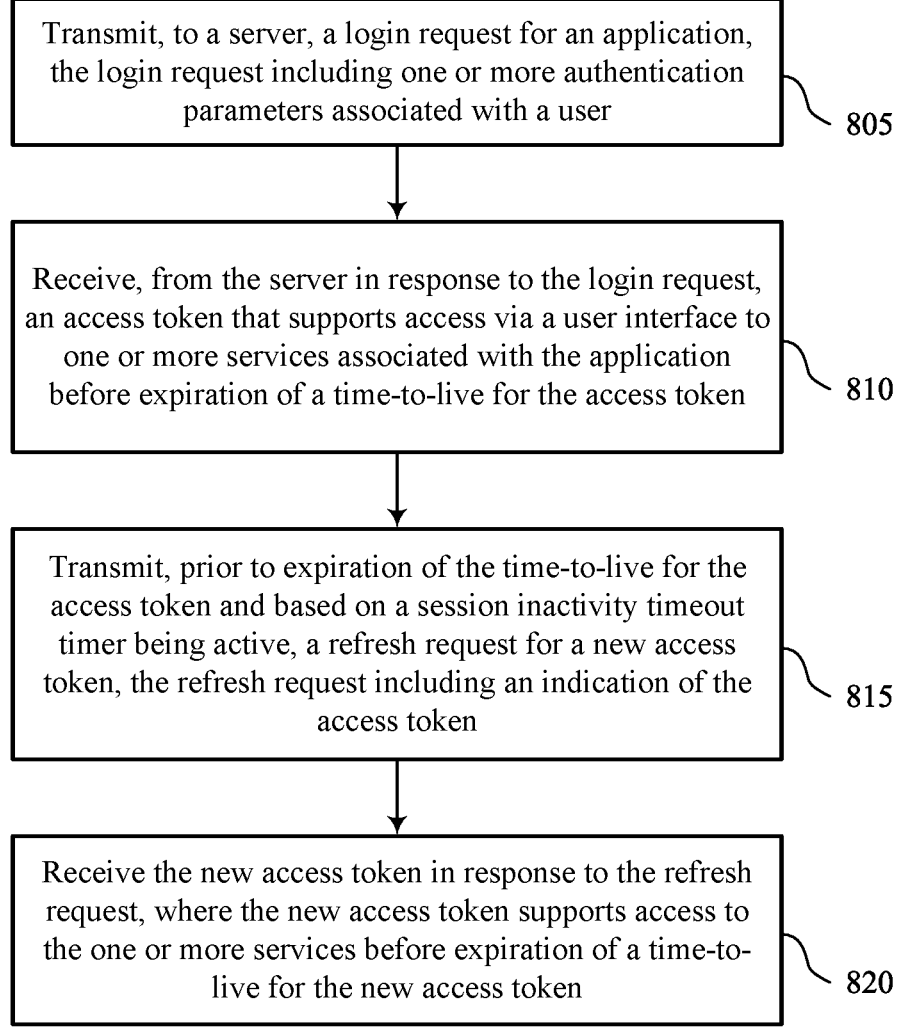

Transmit, to a server, a login request for an application, the login request including one or more authentication parameters associated with a user    805

Receive, from the server in response to the login request, an access token that supports access via a user interface to one or more services associated with the application before expiration of a time-to-live for the access token    810

Transmit, prior to expiration of the time-to-live for the access token and based on a session inactivity timeout timer being active, a refresh request for a new access token, the refresh request including an indication of the access token    815

Receive the new access token in response to the refresh request, where the new access token supports access to the one or more services before expiration of a time-to-live for the new access token    820

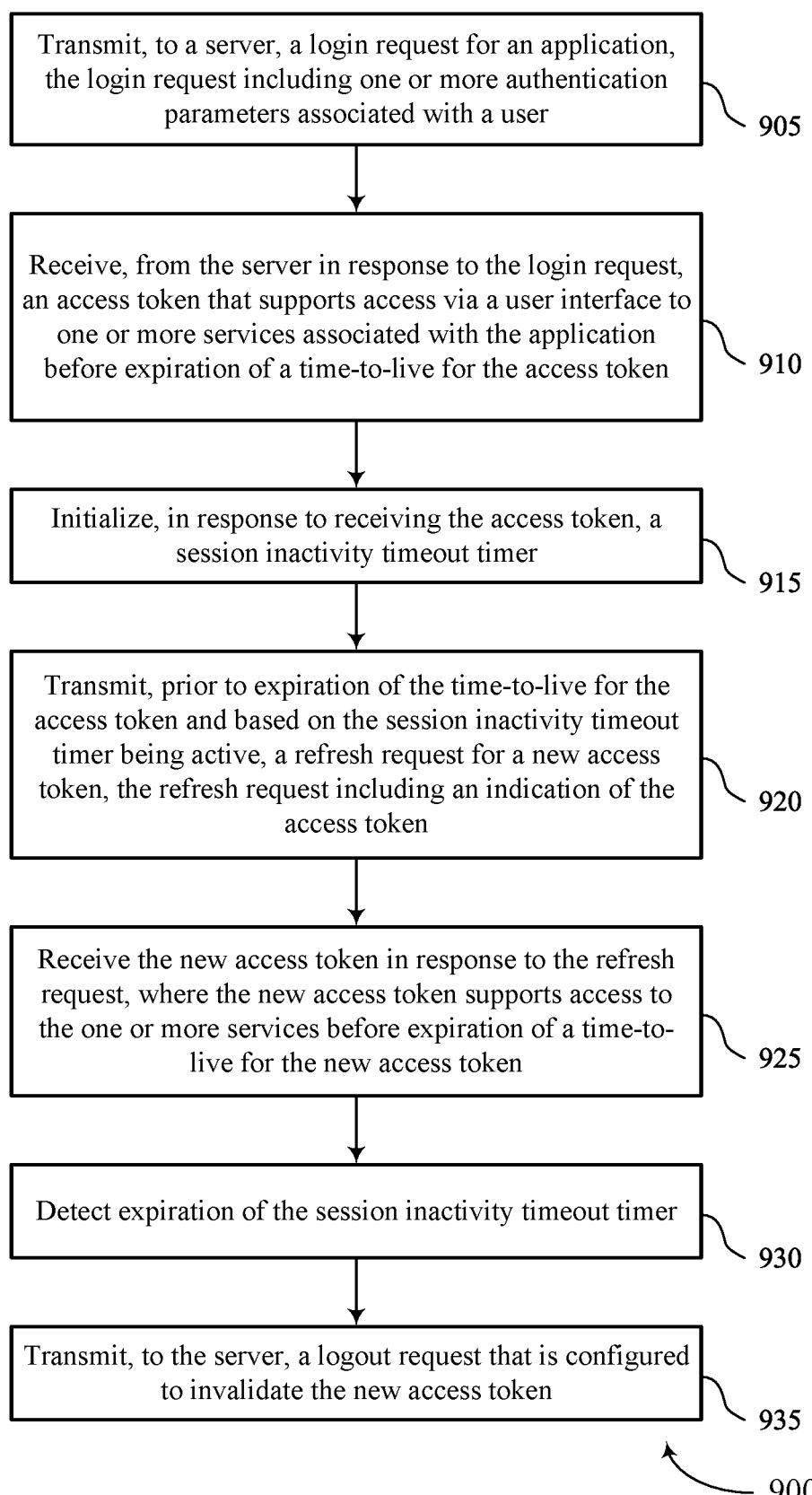

Transmit, to a server, a login request for an application, the login request including one or more authentication parameters associated with a user
905

Receive, from the server in response to the login request, an access token that supports access via a user interface to one or more services associated with the application before expiration of a time-to-live for the access token
910

Initialize, in response to receiving the access token, a session inactivity timeout timer
915

Transmit, prior to expiration of the time-to-live for the access token and based on the session inactivity timeout timer being active, a refresh request for a new access token, the refresh request including an indication of the access token
920

Receive the new access token in response to the refresh request, where the new access token supports access to the one or more services before expiration of a time-to-live for the new access token
925

Detect expiration of the session inactivity timeout timer
930

Transmit, to the server, a logout request that is configured to invalidate the new access token
935

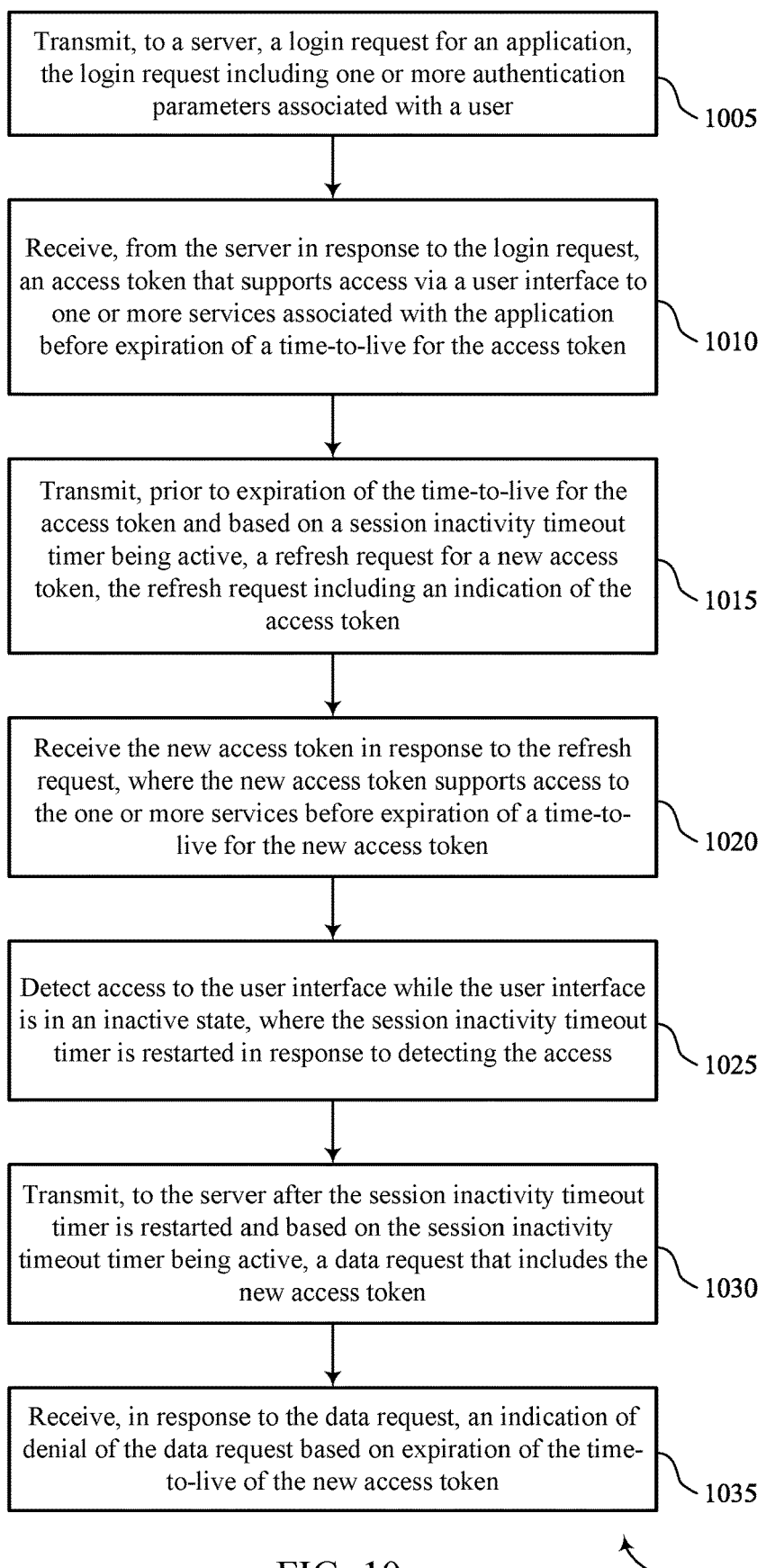

Transmit, to a server, a login request for an application, the login request including one or more authentication parameters associated with a user

1005

Receive, from the server in response to the login request, an access token that supports access via a user interface to one or more services associated with the application before expiration of a time-to-live for the access token

1010

Transmit, prior to expiration of the time-to-live for the access token and based on a session inactivity timeout timer being active, a refresh request for a new access token, the refresh request including an indication of the access token

1015

Receive the new access token in response to the refresh request, where the new access token supports access to the one or more services before expiration of a time-to-live for the new access token

1020

Detect access to the user interface while the user interface is in an inactive state, where the session inactivity timeout timer is restarted in response to detecting the access

1025

Transmit, to the server after the session inactivity timeout timer is restarted and based on the session inactivity timeout timer being active, a data request that includes the new access token

1030

Receive, in response to the data request, an indication of denial of the data request based on expiration of the time-to-live of the new access token

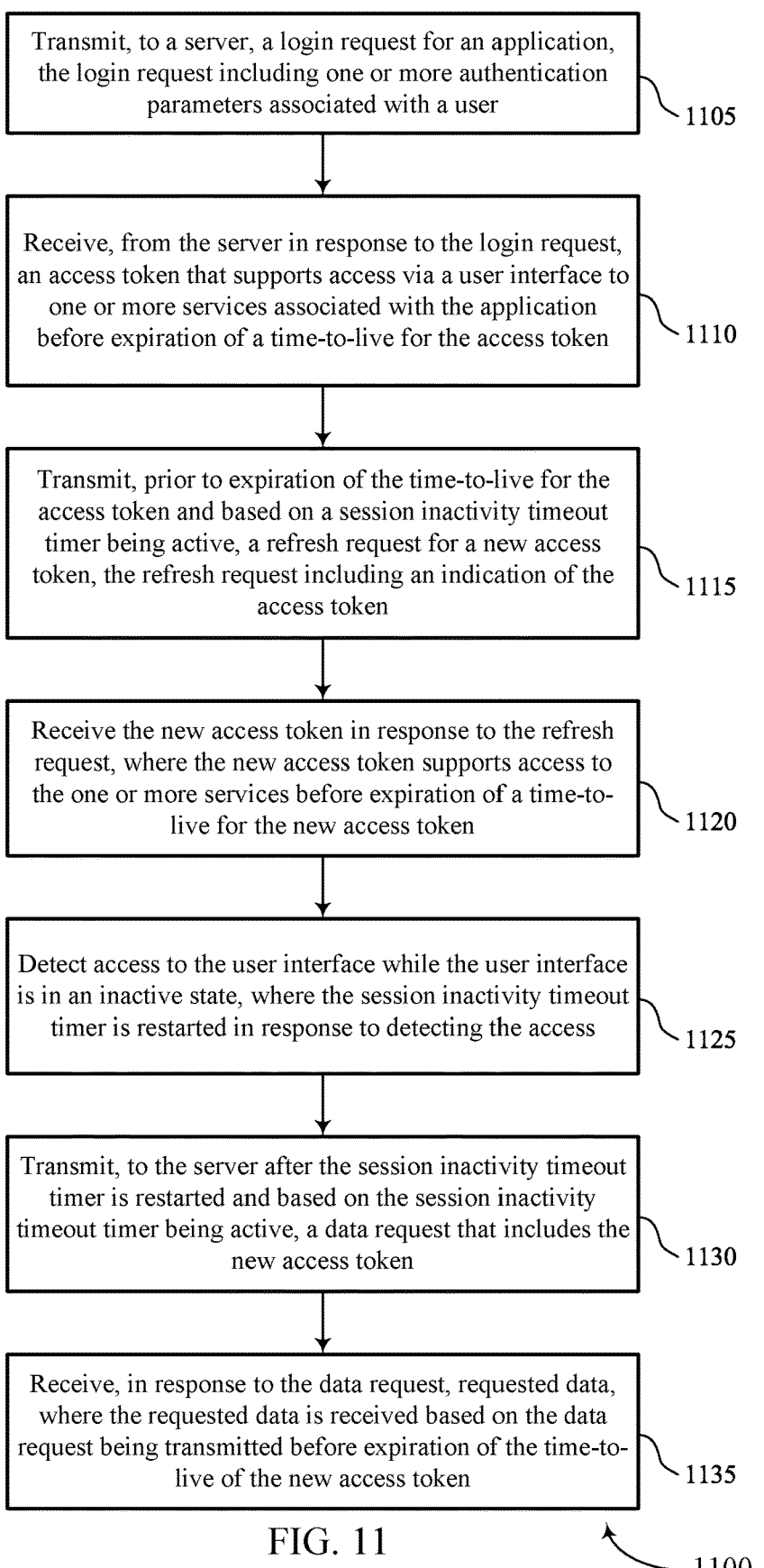

Transmit, to a server, a login request for an application, the login request including one or more authentication parameters associated with a user
1105

Receive, from the server in response to the login request, an access token that supports access via a user interface to one or more services associated with the application before expiration of a time-to-live for the access token
1110

Transmit, prior to expiration of the time-to-live for the access token and based on a session inactivity timeout timer being active, a refresh request for a new access token, the refresh request including an indication of the access token
1115

Receive the new access token in response to the refresh request, where the new access token supports access to the one or more services before expiration of a time-to-live for the new access token
1120

Detect access to the user interface while the user interface is in an inactive state, where the session inactivity timeout timer is restarted in response to detecting the access
1125

Transmit, to the server after the session inactivity timeout timer is restarted and based on the session inactivity timeout timer being active, a data request that includes the new access token
1130

Receive, in response to the data request, requested data, where the requested data is received based on the data request being transmitted before expiration of the time-to-live of the new access token
1135

FIG. 11
1100

SESSION TIMEOUT USING ACCESS TOKEN REFRESH

RELATED APPLICATIONS

The present application claims priority to Indian Patent Application No. 202311015668, entitled "SESSION TIMEOUT USING ACCESS TOKEN REFRESH" and filed Mar. 9, 2023, which is assigned to the assignee hereof and expressly incorporated by reference herein.

FIELD OF TECHNOLOGY

The present disclosure relates generally to data management, including techniques for session timeout using access token refresh.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 8 through 11 show flowcharts illustrating methods that support session timeout using access token refresh in accordance with aspects of the present disclosure.

DETAILED DESCRIPTION

Access control mechanisms are used to control access to services, such as services accessed via web applications. The access control mechanisms may be used to log off a user session after a time of inactivity. Generally, these access control mechanisms may include utilization of multiple tokens (e.g., an access token and a separate refresh token), monitoring of application programming interface (API) requests at a backend, and/or user interface (UI) activity monitoring. The tokens may be provided to the client (e.g., browser) after an authenticated login to the service. However, current techniques may not support the needs of a service level agreement (SLA), especially in the context of data management. In some examples, access control techniques may result in a user having access for extended periods, even though the user has closed the application (e.g., due to the refresh token being longer-lived than the access token). Alternatively, the access control techniques may result in premature timeout when a user is accessing the application, but not in a manner that triggers API calls (e.g., the user is monitoring a management dashboard but not engaging in API-triggering activity).

Techniques described herein support the utilization of a token (e.g., an access token) and an idle timeout component in a client to support access to one or more services. After a user is authenticated (e.g., by username and password), the client receives an access token with a time-to-live. The client also initializes the session inactivity timeout timer that is restarted after detection of a user interacting with the application. If the time-to-live is about to expire (e.g., two mins before expiration) and if the session inactivity timer remains active, then the client may request a new access token, which functionally refreshes the time to live of the access token. If the inactivity timer expires, then the client may transmit a logout request to the backend. If the user closes the application (e.g., closes the tab), then the UI is unable to trigger logout, However, the backend may be configured to invalidate the access token if the access token time-to-live expires. Thus, if the user opens the tab or re-accesses the application, the access token may be invalid even though the session inactivity timer has not expired. The use of a single, self-refreshing access token avoids a user having potential access for undesirably long periods (e.g., by avoiding the use of a separate and longer-lived refresh token) while also avoiding premature timeouts, among other potential advantages. These and other techniques are described in further detail herein with respect to the figures.

Figure 1:
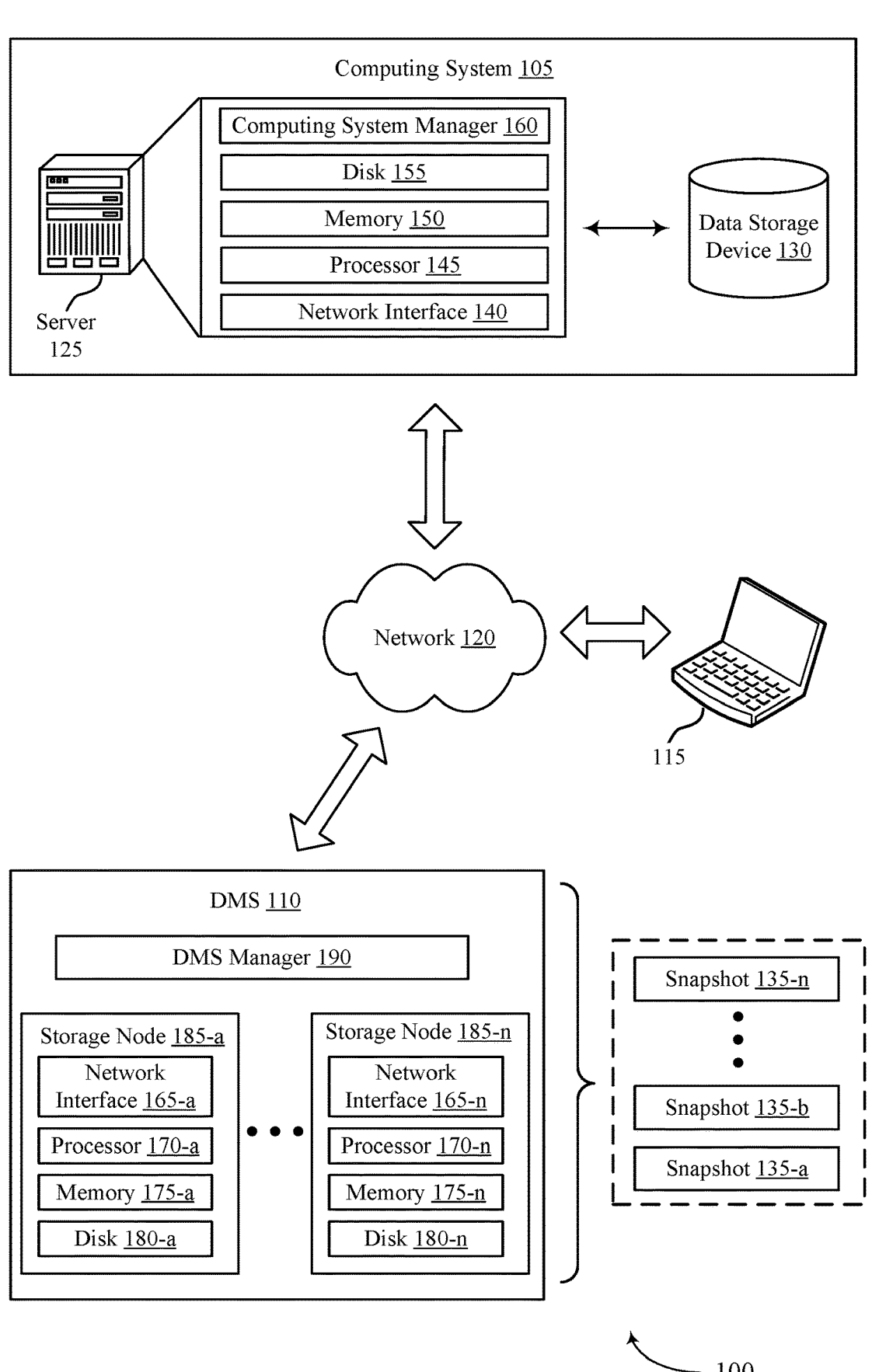
FIG. 1 illustrates an example of a computing environment that supports session timeout using access token refresh in accordance with aspects of the present disclosure.

FIG. 1 illustrates an example of a computing environment 100 that supports session timeout using access token refresh in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

As described herein the DMS 110 may function as a backup system for a host data store of the host environment, such as the data storage device 130 of computing system 105. Additionally, an administrative user may access the DMS 110 to manage backup and recovery services provided by the DMS 110 using a user device, such as the computing device 115. For example, the user may access a client application configured to manage services supported by the DMS 110 using the computing device 115. The client application may be an example of an application installed on the user device 115 and/or a web application accessible via a browser, each of which is referred to as a "client" herein.

In some examples, the client and/or the DMS 110 may enforce access control mechanisms to secure access to services provided by the DMS 110. More particularly, to access the services by the DMS 110, the user may be required to authenticate via the client, such as by entering a username, password, two-factor authentication (2FA) parameters, etc. Additionally, the access control mechanisms may include techniques for limiting access to services after a user is authenticated, such as by automatically logging-out a user after closing an application, after a period of inactivity, etc. As such, a user may reauthenticate via the client to access the services of the DMS 110.

Access control mechanisms, such as those controlling access to services of the DMS 110, may include utilization of multiple tokens (e.g., an access token and a separate refresh token), monitoring of API requests at a backend (e.g., the DMS 110), and/or UI activity monitoring. The tokens may be provided to the client (e.g., browser) after an authenticated login to the service. However, current techniques may not support the needs of an SLA, especially in the context of data management services, such as data management services provided by the DMS 110. In some examples, the techniques may result in a user having access for extended periods, even though the user has closed the application (e.g., due to the refresh token being longer-lived than the access token). Alternatively, the techniques may result in premature timeout when a user is accessing the application, but not in a manner that triggers API calls (e.g., the user is monitoring a management dashboard but not engaging in API-triggering activity).

Techniques described herein support utilization of a token (e.g., an access token) and a session inactivity timeout timer in the client to support access to one or more services. After a user is authenticated (e.g., by username and password), the client receives an access token with a time-to-live. The client also initializes a session inactivity timeout timer that is restarted after detection of a user interacting with the application. If the time-to-live is about to expire (e.g., two mins before expiration) and if the session inactivity timer remains active, then the client may request a new access token, which functionally refreshes the time to live of the access token. If the inactivity timer expires, then the client may transmit a logout request to the backend (e.g., to the DMS 110). In some cases, a user may close the application, tab, or UI that is used to access the client application, and as such, the client is unable to maintain the session inactivity timeout timer. As a result, the client may not transmit a logout request after the timer is configured to expire (e.g., because the client is not active). However, the DMS 110 (e.g., backend) may be configured to invalidate the access token after expiration of the corresponding time-to-live. As such, if the user re-accesses the client, the access token may not be used to access the services of the DMS 110 even though the session inactivity timeout timer is active (e.g., has not expired). In some cases, the user may restart the session (e.g., open the application or tab) before expiration of the access token. In such cases, the user may access the services of the DMS 110. Thus, the use of an access token that is automatically refreshed avoids a user having potential access for undesirably long periods (e.g., by avoiding the use of a separate and longer-lived refresh token) while also avoiding premature timeouts, among other advantages. The access control techniques are described herein with respect to accessing services of a DMS 110, but it should be understood that the techniques may be used with other applications and services outside of data management.

Figure 2:
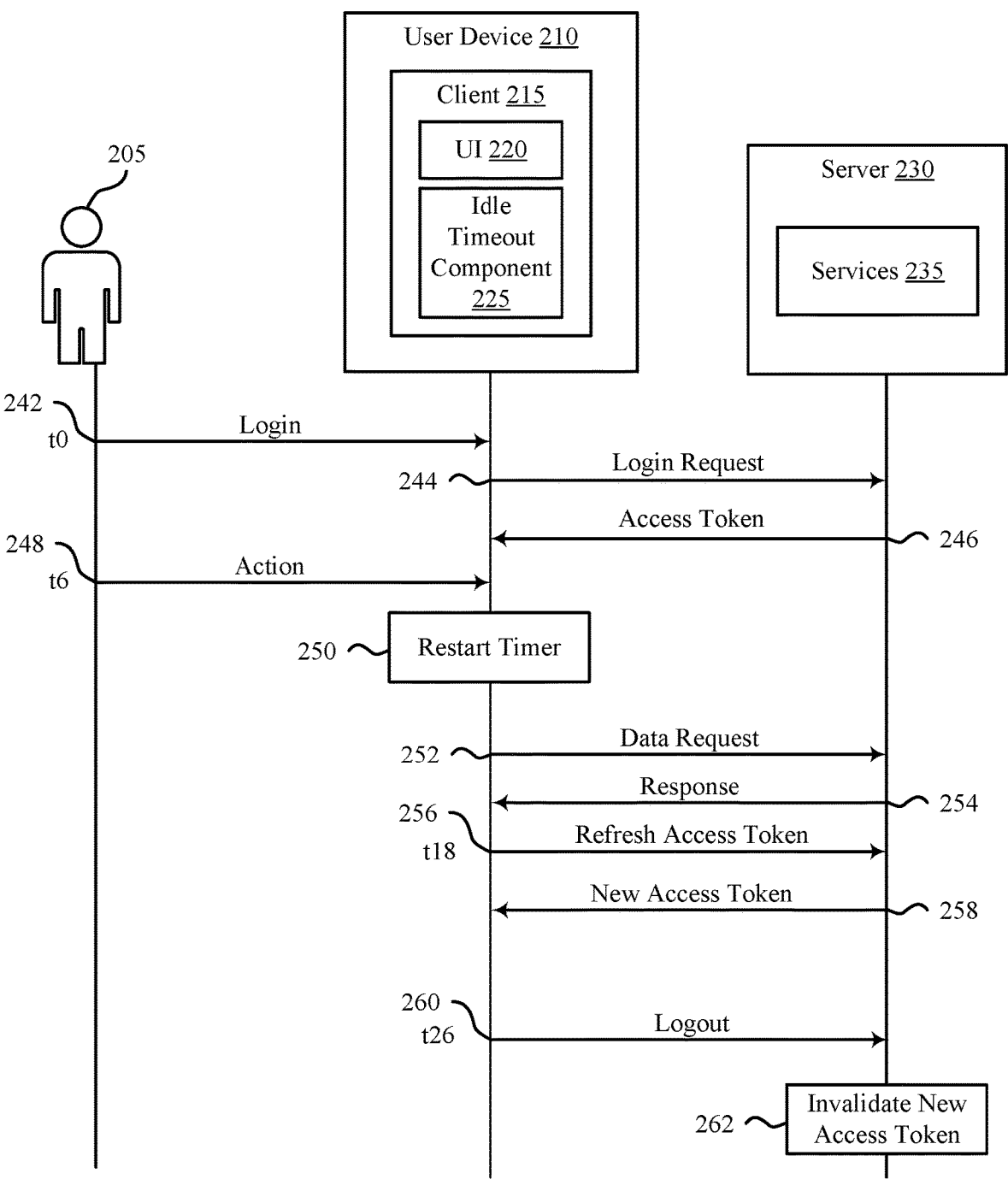
FIG. 2 shows an example of a process flow that supports session timeout using access token refresh in accordance with aspects of the present disclosure.

FIG. 2 shows an example of a process flow 200 that supports session timeout using access token refresh in accordance with aspects of the present disclosure. The process flow 200 includes a user 205, a user device 210, and a server 230. The user device 210 may be an example of the computing device 115 as described with respect to FIG. 1. The server 230 may be an example of one or more servers that support a DMS 110, as described with respect to FIG. 1. More particularly, the server 230 may support services 235 related to data management, such as backup services, data recovery services, and the like, such as the services described with respect to FIG. 1. Additionally, or alternatively, the server 230 may be a server that supports other types of services 235.

The user 205 may access the services 235 of the server 230 via a client 215 on the user device 210. The client 215 may be an example of a standalone application, a web application, a website, or the like. For example, the user 205 may access the services 235 via a website on a browser of the user device 210. To access the services 235, the user 205 may login via the client 215, such as by entering a username and password or other authentication parameters (e.g., biometric authentication, 2FA). After the user is logged in, the server 230 and/or the client 215 may employ some access control techniques to secure the client 215 and/or data of the server 230. For example, the server 230 may include an authentication service or access control services to manage access control via the client 215. The client 215 and the services 235 of the server 230 may collectively be referred to as an "application" herein.

Access control techniques may be configured to log off the user session after a defined period of inactivity. In such cases, users may create new sessions by re-authentication in order to gain additional access. In some cases, users are notified (e.g., with a warning) before a session is ended. When multiple tabs are opened using the same session token, the activity across other tabs may be considered in determined whether to end a session. That is, as long as the user is active in one of the tabs, the session may remain open. Some access control techniques may utilize session inactivity timeout timers, and/or idle timeout techniques for web applications. In one example, an access token and a refresh token are used for access control. In this approach, the client may be given an access token and a refresh token. The access token may be used for all session communications, and the expiry time for the access token may be set to a session inactivity time so that the user may not continue the session beyond the defined time of inactivity. The refresh token is used to obtain a new access token once the exiting access token expires. Thus, if the user is active and would like to continue the session, the access token may be refreshed. In this approach, the expiry time for the refresh token may be large so that even after the access token is expired due to inactivity, the user may continue to gain access via the refresh token without providing credentials.

In another approach, the UI of the client may handle identification of inactivity by the user. In such cases, an idle timeout component may run in the frontend (e.g., the client) and will notify/trigger a logout event to the backend (e.g., the server) whenever the session is inactive beyond the configured timeout. This solution may be implemented with either a single token (e.g., an access token) approach or with a double token approach (e.g., access token and refresh token). The issue with this approach is that inactivity is determined by the frontend, and as such, when the user closes the window or application where the idle timeout is running, no notification is sent to the backend for session termination. Thus, when the user reopens the window and accesses the web UI, the web UI may start a new idle timeout timer and may not honor the user's inactivity when the window is closed.

In yet another approach, the session inactivity may be determined from the backend via API calls made to the backend. In this approach, the backend may document a time stamp associated with calls/requests (e.g., API calls) made to the backend. If no calls are made after a threshold time, then the backend may terminate the session. With this approach, the user may not trigger any API call to the backend, but the user may be performing an operation on the frontend (e.g., monitoring a dashboard). However, since the backend does not receive a call, the backend may terminate the session prematurely. To solve this problem the client may execute a background job (similar to a health check), which may trigger calls periodically. However, the session may not terminate for undesired extended period due to periodic activity. These solutions may not achieve compliance (e.g., SLA compliance) for inactivity and may not terminate the session in accordance with the intended inactivity time.

Techniques described herein support SLA compliance for session termination without premature termination using a "self-refreshable access token" and an idle timeout component 225 in the client 215. In some examples, the idle timeout component 225 is part of the UI 220. The idle timeout component 225 may initiate and maintain a session inactivity timeout timer. The client 215 may also include a periodic frontend job that is configured to fetch a new access token before expiration of the current access token. In this approach, a refresh token may not be used to retrieve the new access token. Thus, if the existing access token expired (before retrieving a new access token), then the session may be completely terminated.

The access token described herein may be short-lived in that is configured to expire based on the session inactive time. As such, the window to retrieve a new access token is restricted such that when the user 205 closes the application (e.g., tab or web browser), the user 205 would need to reopen the application before expiration of the access token to continue the session. In cases where the user does not close the application, the idle timeout component 225 in the client 215 identifies session inactivity (e.g., based on expiration of a timer) and terminates the session. Additionally, the access token is periodically refreshed (e.g., using refresh job) to fetch the new access token to ensure that the session continues when the user 205 is actively using the session.

The user session may be created when the user 205 logs-in with the credentials (e.g., username and password), and after log-in, the access token may be generated for the session. The access token may include a time-to-live (expiry time) which may be equivalent to the session inactivity timeout timer. The idle timeout component 225 monitors hardware movements such as, for example, mouse movements, clicks, and key pressing, and resets the inactivity timeout timer whenever activity is detected. In some examples, the idle timeout component 225 is active when the client is accessed (e.g., the tab with the website is open). When the user 205 closes the application (e.g., closes the browser window), then the idle timeout component 225 may not be able to monitor session inactivity. In this case, the user session may be valid until the access token expires, which, in some examples, may not last beyond the configured inactivity timeout. The periodic refresh job of the client 215 may ensure new access token is retrieved as long as at least one tab is open for the session.

Figure 3:
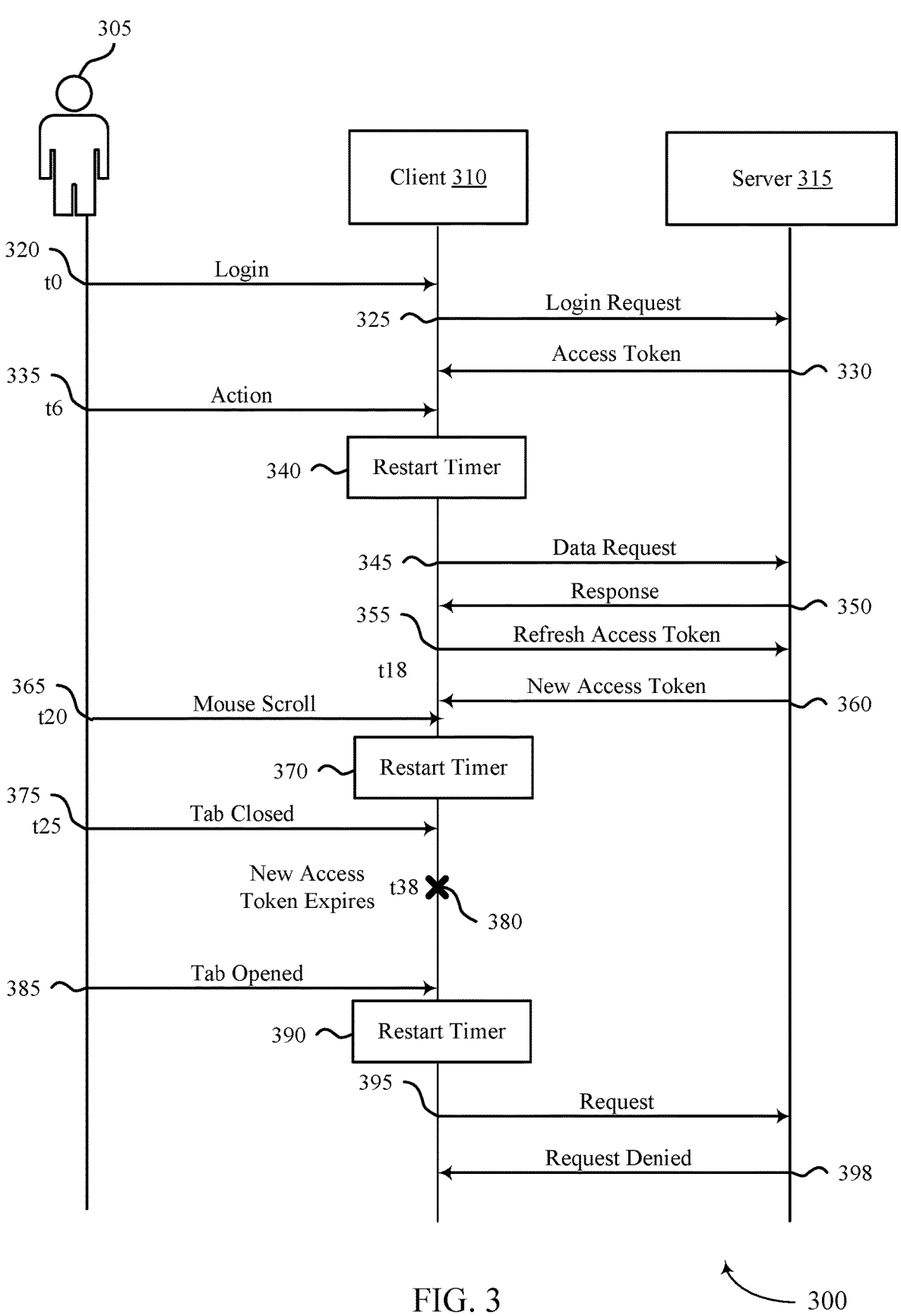
FIG. 3 shows an example of a process flow that supports session timeout using access token refresh in accordance with aspects of the present disclosure.
Figure 4:
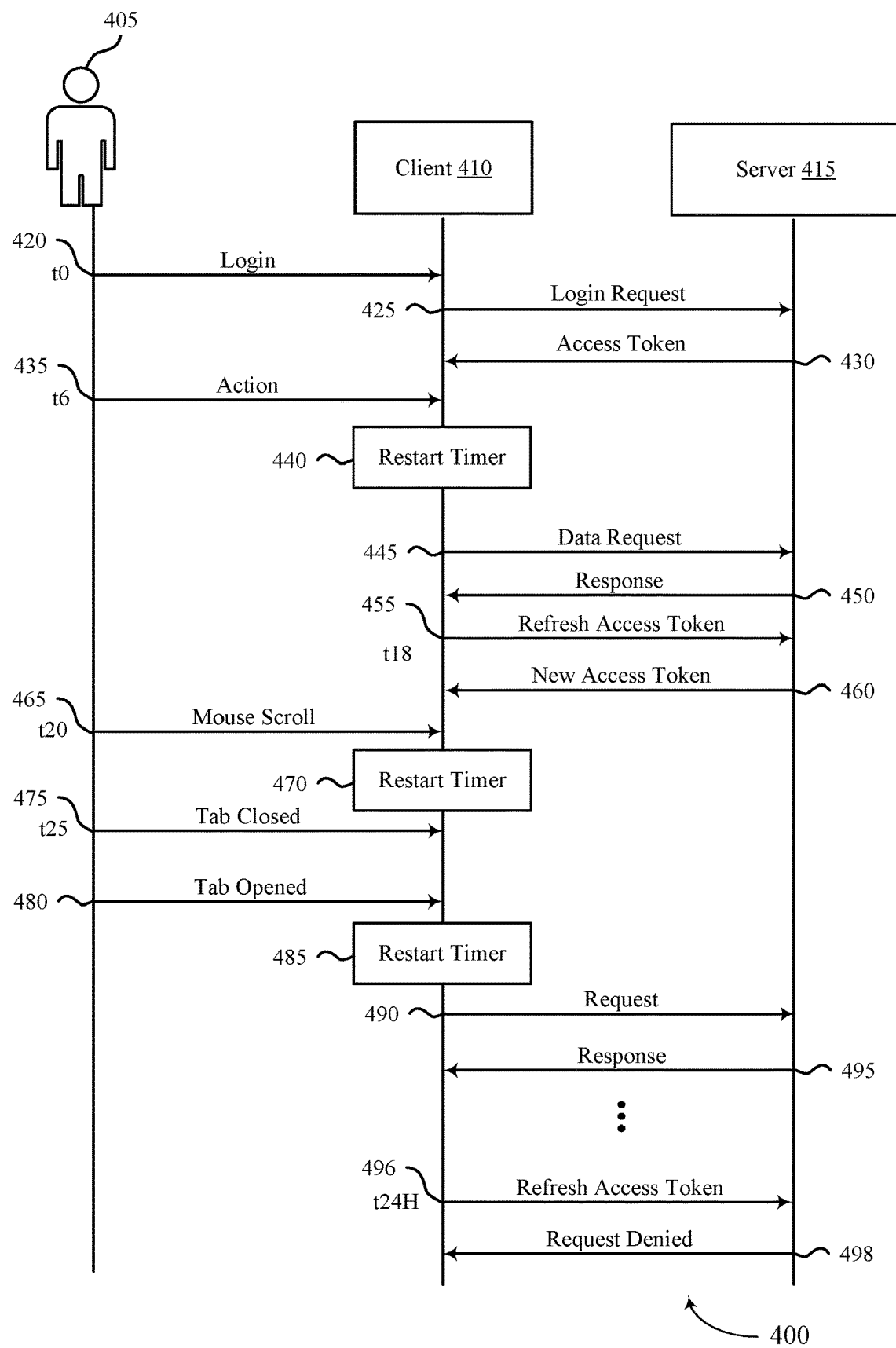
FIG. 4 shows an example of a process flow that supports session timeout using access token refresh in accordance with aspects of the present disclosure.

In the process flow 200 of FIG. 2, the process flow 300 of FIG. 3, and the process flow 400 of FIG. 4, the session inactivity timeout timer is set to 20 minutes and the time-to-live of the access token is 20 minutes. At 242 (t0 or 0 minutes), the user 205 may perform an action to login to the client 215, such as entering credentials and activating a submit button. In response, at 244, the client 215 may transmit to the server 230, a login request for the application (e.g., client 215). The login request may include one or more authentication parameters associated with the user 205. For example, the one or more authentication parameters include credentials such as username, password, biometric information, 2FA parameters, or the like. At 246, the client 215 may receive, from the server 230 in response to the login request, an access token that supports access via the UI 220, to one or more services 235 associated with the application before expiration of a time-to-live for the access token. More particularly, the access token may be associated with or configured with a time-to-live. In some examples, the access token is an example of a JavaScript object notation (JSON) web object.

At 248, the idle timeout component 225 may detect an action by a peripheral device in associated with the UI 220 of the application. For example, the action may be a mouse movement, a key press, a mouse click, a cursor navigation, a touchscreen touch, or the like. At 250, the idle timeout component 225 of the client 215 may restart the session inactivity timeout timer (e.g., reset the timer to 20 minutes). In some cases, the action may cause a data request (e.g., API request) to be transmitted, at 252, to the server 230. The data request may include an indication of the access token. At 254, the client 215 may receive, in response to the data request, a response. In some examples, the response includes requested data.

At 256 (t18 or 18 minutes), the client 215 may transmit, to the server 230, a refresh request for a new access token, and the refresh request may include an indication of the access token. The refresh request may be transmitted prior to expiration of the time-to-live for the access token and based on the session inactivity timeout timer being active. For example, if the time-to-live reaches a threshold (e.g., two mins before expiration), then the refresh request is transmitted. At 258, the client 215 may receive the new access token in response to the refresh request. The new access token supports access to the one or more services 235 before expiration of a time-to-live for the new access token. In some examples, in response to receiving the refresh request, the server 230 may invalidate the old/initial access token by adding an identifier of the access token to a blacklist or deny list.

Thus, at t6 (6 minutes), some activity by the user 205 at the UI 220 and the session inactivity timer is reset to 20 mins. At t18, the access token is refreshed. Thereafter, no activity is detected. As such, at t26, the session inactivity timeout time expires, and at 260, the client 215 transmits a logout request to the server 230. At 262, the server 230 invalidates the new access token. For example, the server 230 adds an identifier for the new access token to a deny list or blacklist. Thus, in the scenario of FIG. 2, the user session is terminated after inactivity without closing the application (e.g., the browser or tab).

FIG. 3 shows an example of a process flow 300 that supports session timeout using access token refresh in accordance with aspects of the present disclosure. The process flow 300 includes a user 305, a client 310, and a server 315, which may be examples of the corresponding aspects described with respect to FIGS. 1 and 2. For example, the client 310 and the server 315 may correspond to an application used to access one or more services, such as data management services.

At 320 (t0 or 0 minutes), the user 305 may perform an action to login to the client 310, such as entering credentials and activating a submit button. In response, at 325, the client 310 may transmit to the server 315, a login request for the application (e.g., client 310). The login request may include one or more authentication parameters associated with the user 305. For example, the one or more authentication parameters include credentials, such as username, password, biometric information, 2FA parameters, or the like. At 330, the client 310 may receive, from the server 315 in response to the login request, an access token that supports access, via the UI of the client 310, to one or more services associated with the application before expiration of a time-to-live for the access token. More particularly, the access token may be associated with or configured with a time-to-live. In some examples, the access token is an example of a JSON web object.

At 335, the client 310 may detect an action by a peripheral device in associated with the UI of the client 310. For example, the action is a mouse movement, a key press, a mouse click, a cursor navigation, a touchscreen touch, or the like. At 340, the client 310 may restart the session inactivity timeout timer (e.g., reset the timer to 20 minutes). In some cases, the action may cause a data request (e.g., API request) to be transmitted, 345, to the server 315. The data request may include an indication of the access token. At 350, the client 310 may receive, in response to the data request, a response. In some examples, the response includes requested data.

At 355 (t18 or 18 minutes), the client 310 may transmit, to the server 315, a refresh request for a new access token, and the refresh request may include an indication of the access token. The refresh request may be transmitted prior to expiration of the time-to-live for the access token and based on the session inactivity timeout timer being active. For example, if the time-to-live reaches a threshold (e.g., two mins before expiration) and the session inactivity timeout timer is active, then the refresh request is transmitted. At 360, the client 310 may receive the new access token in response to the refresh request. The new access token supports access to the one or more services of the server 315 before expiration of a time-to-live for the new access token. In some examples, in response to receiving the refresh request, the server 315 may invalidate the old/initial access token by adding an identifier of the access token to a blacklist or deny list.

At 365, the client 310 detects an action by a peripheral device in association with the user interface of the application. In the example of FIG. 3, the action is a mouse scroll. Accordingly, at 370, the client 310 restarts the session inactivity timeout timer (e.g., resets timer to 20 minutes).

At 375 (e.g., t25 or 25 minutes), the user 305 may close the client 310. Specifically, in the example of FIG. 3, the user closes the tab (e.g., browser tab) that is used to access the client 310. As such, the client 310 is unable to track in session inactivity or maintain the timer (or transmit a logout request after expiration of the timer). It is assumed for the purposes of this description that there is no other tab or application access at 375. At 380 (e.g., t38 or 38 minutes), the new access token expires. That is, 20 minutes after the token refresh, the new token expires. Additionally, because the application or tab is closed, the client 310 is unable to refresh the new access token. At 385, the user reopens the tab (e.g., reopens the application). Thus, the client 310 may detect access to the user interface (while the user interface is inactive because it was closed). In response, the client 310 may restart the session inactivity timeout timer at 390.

At 395, the client 310 transmits, to the server 315, after the session inactivity timeout timer is restarted and based at least in part on the session inactivity timeout timer being active, a data request that includes the new access token. At 398, the client 310 may receive in response to the data request, an indication of denial of the data request based on expiration of the time-to-live of the new access token. Thus, the user 305 may be required to re-authenticate to the server 315 via the client 310.

Thus, the process flow 300 of FIG. 3 illustrates a user closing a tab (e.g., closing the application) at 375 and the new access token expiring at 380 while the tab is closed. The user reopens the tab at 385 and the client 310 tries to make a data request at 395 using the new access token. At 398, the server denies the request because the new access token is expired. Thus, the user is denied access even if the session inactivity timeout timer is active.

FIG. 4 shows an example of a process flow 400 that supports session timeout using access token refresh in accordance with aspects of the present disclosure. The process flow 400 includes a user 405, a client 410, and a server 415, which may be examples of the corresponding aspects described with respect to FIGS. 1 through 3. For example, the client 410 and the server 415 may correspond to an application used to access one or more services, such as data management services.

At 420 (t0 or 0 minutes), the user 405 may perform an action to login to the client 410, such as entering credentials and activating a submit button. In response, at 425, the client 410 may transmit to the server 415, a login request for the application (e.g., client 410). The login request may include one or more authentication parameters associated with the user 405. For example, the one or more authentication parameters include credentials, such as username, password, biometric information, 2FA parameters, or the like. At 430, the client 410 may receive, from the server 415 in response to the login request, an access token that supports access, via the UI of the client 410, to one or more services associated with the application before expiration of a time-to-live for the access token. More particularly, the access token may be associated with or configured with a time-to-live. In some examples, the access token is an example of a JSON web object.

At 435, the client 410 may detect an action by a peripheral device, where the action is associated with the UI of the client 410. For example, the action is a mouse movement, a key press, a mouse click, a cursor navigation, a touchscreen touch, or the like. At 440, the client 410 may restart the session inactivity timeout timer (e.g., reset the timer to 20 minutes). In some cases, the action may cause a data request (e.g., API request) to be transmitted, 445, to the server 415. The data request may include an indication of the access token. At 450, the client 410 may receive, in response to the data request, a response. In some examples, the response includes requested data.

At 455 (t18 or 18 minutes), the client 410 may transmit, to the server 415, a refresh request for a new access token, and the refresh request may include an indication of the access token. The refresh request may be transmitted prior to expiration of the time-to-live for the access token and based on the session inactivity timeout timer being active. For example, if the time-to-live reaches a threshold (e.g., two mins before expiration) and the session inactivity timeout timer is active, then the refresh request is transmitted. At 460, the client 410 may receive the new access token in response to the refresh request. The new access token supports access to the one or more services of the server 415 before expiration of a time-to-live for the new access token. In some examples, in response to receiving the refresh request, the server 415 may invalidate the old/initial access token by adding an identifier of the access token to a blacklist or deny list.

At 465, the client 410 detects an action by a peripheral device in association with the user interface of the application. In the example of FIG. 4, the action is a mouse scroll. Accordingly, at 470, the client 410 restarts the session inactivity timeout timer (e.g., resets timer to 20 minutes).

At 475 (e.g., t25 or 25 minutes), the user 405 may close the client 410. Specifically, in the example of FIG. 4, the user closes the tab (e.g., browser tab) that is used to access the client 410. As such, the client 410 is unable to track in session inactivity or maintain the timer (or transmit a logout request after expiration of the timer). It is assumed for the purposes of this description that there is no other tab or application access at 475. At 480, the user 405 reopens the tab (e.g., reopens the application). Thus, the client 410 detects access to the UI (e.g., while the UI is in an inactive state because it was closed). At 485, the session inactivity timeout timer is restarted in response to detecting the access.

At 490, the client 410 transmits, to the server 415 after the session inactivity timeout timer is restarted and based on the session inactivity timeout timer being active, a data request that includes the new access token. At 495, the client 410 may receive, in response to the data request, requested data, wherein the requested data is received based on the data request being transmitted before expiration of the time-to-live of the new access token.

Thus, the process flow 400 of FIG. 4 specifically illustrates a user closing a tab (e.g., closing the application) at 475 and reopening the tab (e.g., reopening the application) at 480 before the new access token expires. At 485, the client 410 triggers a request to the server 415, and the server 415 transmits a response at 490 based on the new access token being active. Thus, the user 405 is allowed to access the application after closing the tab by using the access token.

At 496 (e.g., 24 hours after the session is initiated), the client 410 transmits, to the server 415, an additional refresh request for a subsequent access token. The additional refresh request may be transmitted because the session has been active since the response at 495. That is, the user maintains access to the client 410 based on activity and access token refreshes. At 498, the client 410 may receive, in response to the additional refresh request, an indication of denial of the additional refresh request based on a duration of a session period exceeding a maximum duration threshold. That is, the application (e.g., the client 410 and/or the server 415) may maintain a maximum session duration (e.g., 24 hours). Thus, after 24 hours of session activity, the access token refresh request may be denied. This may result in the user 405 having to re-authenticate.

Thus, the process flow 400 of FIG. 4 also illustrates a technique for session termination after a session duration exceeding a maximum duration threshold (e.g., 24 hours in this example). This technique may further increase security, and the user 405 may be required to re-authenticate to access the services of the server 415.

Figure 5:
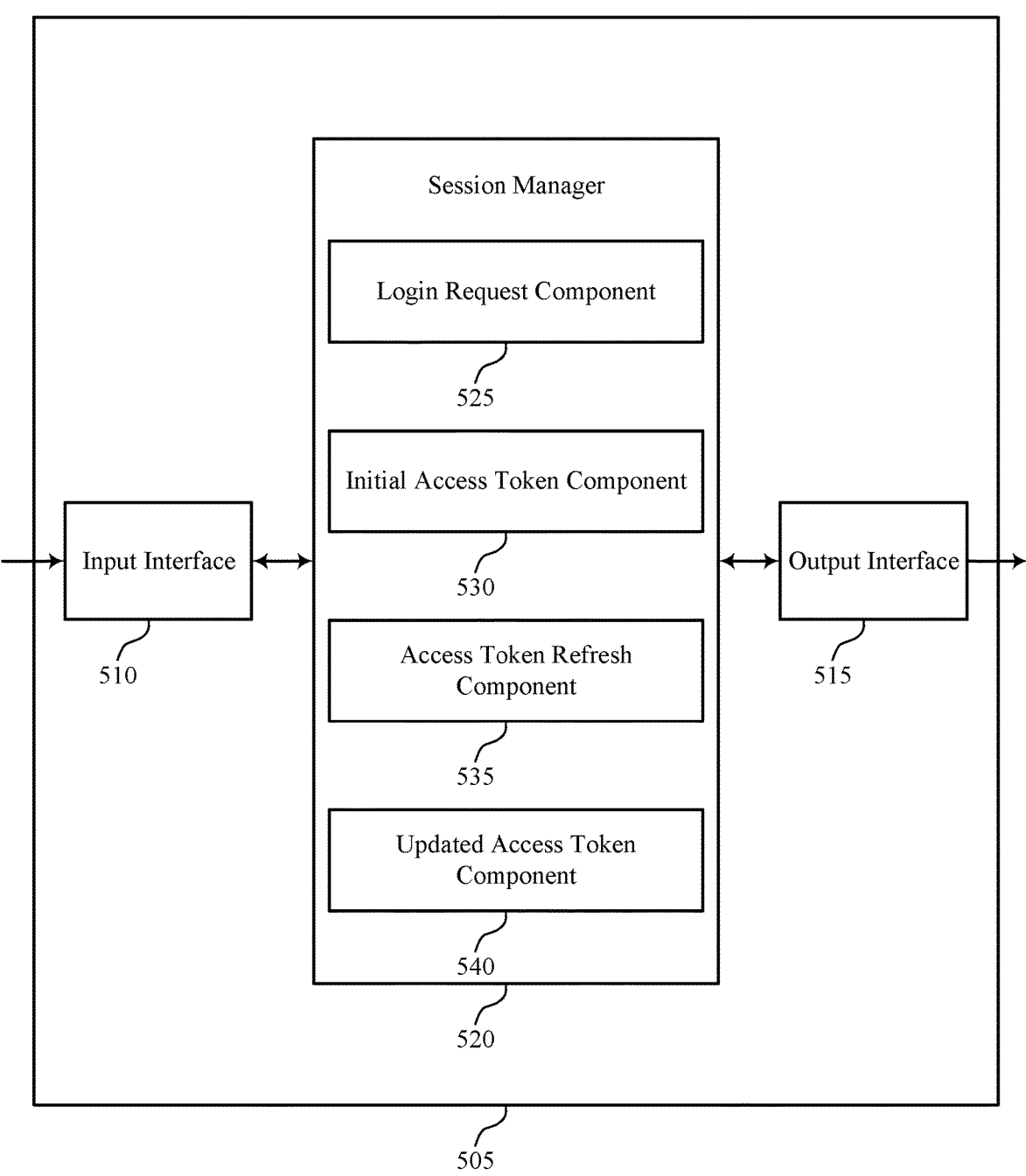
FIG. 5 shows a block diagram of an apparatus that supports session timeout using access token refresh in accordance with aspects of the present disclosure.

FIG. 5 shows a block diagram 500 of a system 505 that supports session timeout using access token refresh in accordance with aspects of the present disclosure. In some examples, the system 505 may be an example of aspects of one or more components described with reference to FIG. 1, such as a DMS 110 or a computing device 115. The system 505 may include an input interface 510, an output interface 515, and a session manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the session manager 520 to support session timeout using access token refresh. In some cases, the input interface 510 may be a component of a network interface 725 as described with reference to FIG. 7.

The output interface 515 may manage output signaling for the system 505. For example, the output interface 515 may receive signaling from other components of the system 505, such as the session manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the session manager 520 may include a login request component 525, an initial access token component 530, an access token refresh component 535, an updated access token component 540, or any combination thereof. In some examples, the session manager 520, or various components thereof, may be configured to perform various operations (e.g., receiving, monitoring, transmitting) using or otherwise in cooperation with the input interface 510, the output interface 515, or both. For example, the session manager 520 may receive information from the input interface 510, send information to the output interface 515, or be integrated in combination with the input interface 510, the output interface 515, or both to receive information, transmit information, or perform various other operations as described herein.

The login request component 525 may be configured as or otherwise support a means for transmitting, to a server, a login request for an application, the login request including one or more authentication parameters associated with a user. The initial access token component 530 may be configured as or otherwise support a means for receiving, from the server in response to the login request, an access token that supports access via a user interface to one or more services associated with the application before expiration of a time-to-live for the access token. The access token refresh component 535 may be configured as or otherwise support a means for transmitting, prior to expiration of the time-to-live for the access token and based on a session inactivity timeout timer being active, a refresh request for a new access token, the refresh request including an indication of the access token. The updated access token component 540 may be configured as or otherwise support a means for receiving the new access token in response to the refresh request, where the new access token supports access to the one or more services before expiration of a time-to-live for the new access token.

Figure 6:
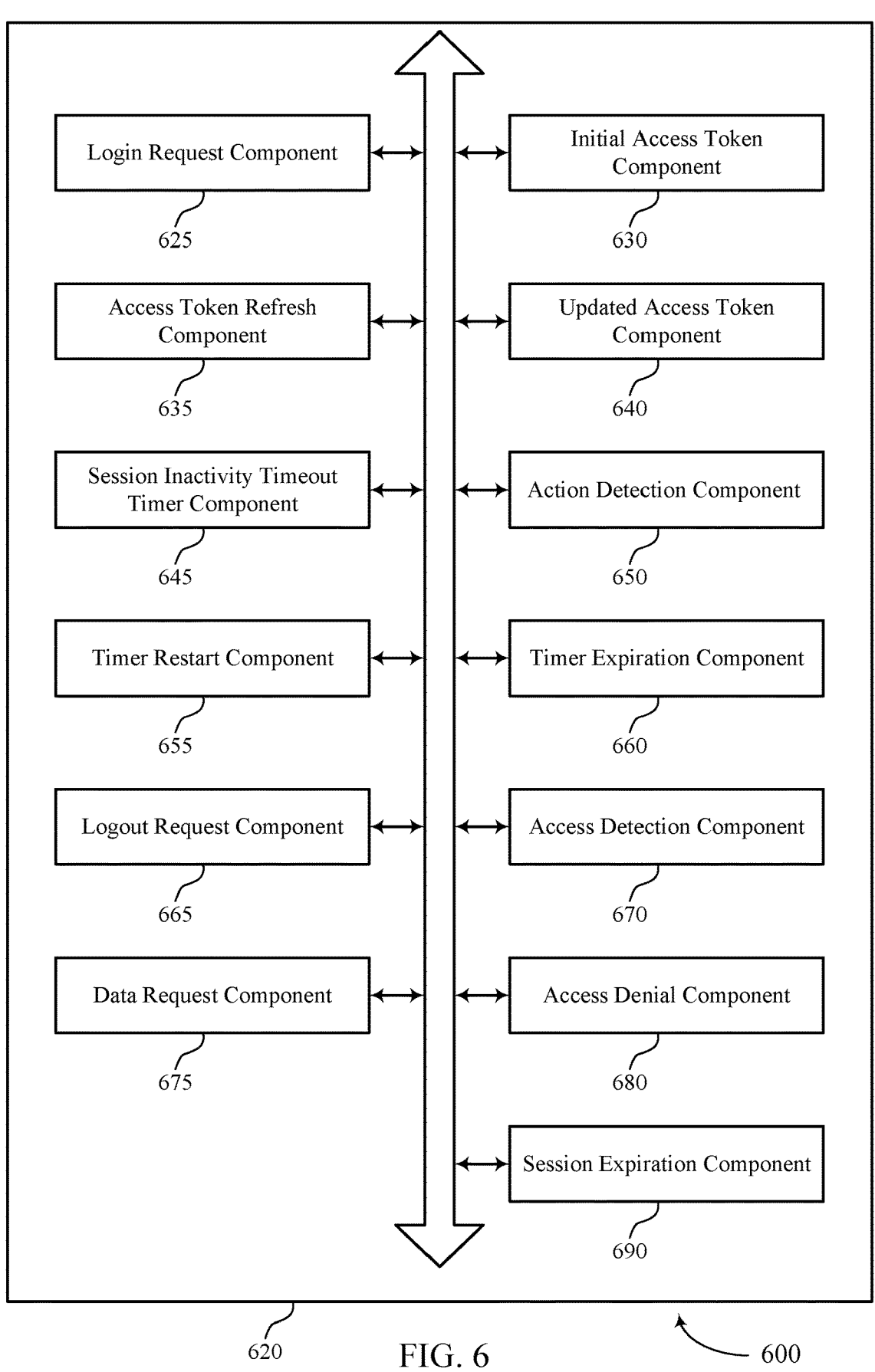
FIG. 6 shows a block diagram of a session manager that supports session timeout using access token refresh in accordance with aspects of the present disclosure.

FIG. 6 shows a block diagram 600 of a session manager 620 that supports session timeout using access token refresh in accordance with aspects of the present disclosure. The session manager 620 may be an example of aspects of a session manager 520, as described herein. The session manager 620, or various components thereof, may be an example of means for performing various aspects of session timeout using access token refresh as described herein. For example, the session manager 620 may include a login request component 625, an initial access token component 630, an access token refresh component 635, an updated access token component 640, a session inactivity timeout timer component 645, an action detection component 650, a timer restart component 655, a timer expiration component 660, a logout request component 665, an access detection component 670, a data request component 675, an access denial component 680, a session expiration component 690, or any combination thereof. Each of these components may communicate, directly or indirectly, with one another (e.g., via one or more buses, communications links, communications interfaces, or any combination thereof).

The login request component 625 may be configured as or otherwise support a means for transmitting, to a server, a login request for an application, the login request including one or more authentication parameters associated with a user. The initial access token component 630 may be configured as or otherwise support a means for receiving, from the server in response to the login request, an access token that supports access via a user interface to one or more services associated with the application before expiration of a time-to-live for the access token. The access token refresh component 635 may be configured as or otherwise support a means for transmitting, prior to expiration of the time-to-live for the access token and based on a session inactivity timeout timer being active, a refresh request for a new access token, the refresh request including an indication of the access token. The updated access token component 640 may be configured as or otherwise support a means for receiving the new access token in response to the refresh request, where the new access token supports access to the one or more services before expiration of a time-to-live for the new access token.

In some examples, the session inactivity timeout timer component 645 may be configured as or otherwise support a means for initializing, in response to receiving the access token, the session inactivity timeout timer.

In some examples, the action detection component 650 may be configured as or otherwise support a means for detecting an action by a peripheral device in association with the user interface of the application. In some examples, the timer restart component 655 may be configured as or otherwise support a means for restarting the session inactivity timeout timer in response to detecting the action.

In some examples, the session inactivity timeout timer is initialized with a same duration as the time-to-live for the access token.

In some examples, the timer expiration component 660 may be configured as or otherwise support a means for detecting expiration of the session inactivity timeout timer. In some examples, the logout request component 665 may be configured as or otherwise support a means for transmitting, to the server, a logout request that is configured to invalidate the new access token.

In some examples, the access detection component 670 may be configured as or otherwise support a means for detecting access to the user interface while the user interface is in an inactive state, where the session inactivity timeout timer is restarted in response to detecting the access. In some examples, the data request component 675 may be configured as or otherwise support a means for transmitting, to the server after the session inactivity timeout timer is restarted and based on the session inactivity timeout timer being active, a data request that includes the new access token. In some examples, the access denial component 680 may be configured as or otherwise support a means for receiving, in response to the data request, an indication of denial of the data request based on expiration of the time-to-live of the new access token.

In some examples, the user interface is in the inactive state when the access is detected based on the application being closed, a tab displaying the user interface being closed, or any combination thereof.

In some examples, the access detection component 670 may be configured as or otherwise support a means for detecting access to the user interface while the user interface is in an inactive state, where the session inactivity timeout timer is restarted in response to detecting the access. In some examples, the data request component 675 may be configured as or otherwise support a means for transmitting, to the server after the session inactivity timeout timer is restarted and based on the session inactivity timeout timer being active, a data request that includes the new access token. In some examples, the data request component 675 may be configured as or otherwise support a means for receiving, in response to the data request, requested data, where the requested data is received based on the data request being transmitted before expiration of the time-to-live of the new access token.

In some examples, the server is associated with a data management service that is configured to manage backup of one or more data sources associated with the data management service. In some examples, the time-to-live of the access token is associated with a service level agreement for the data management service.

In some examples, the session expiration component 690 may be configured as or otherwise support a means for transmitting an additional refresh request for a subsequent access token and means for receiving, in response to the additional refresh request, an indication of denial of the additional refresh request based on a duration of a session period exceeding a maximum duration threshold.

Figure 7:
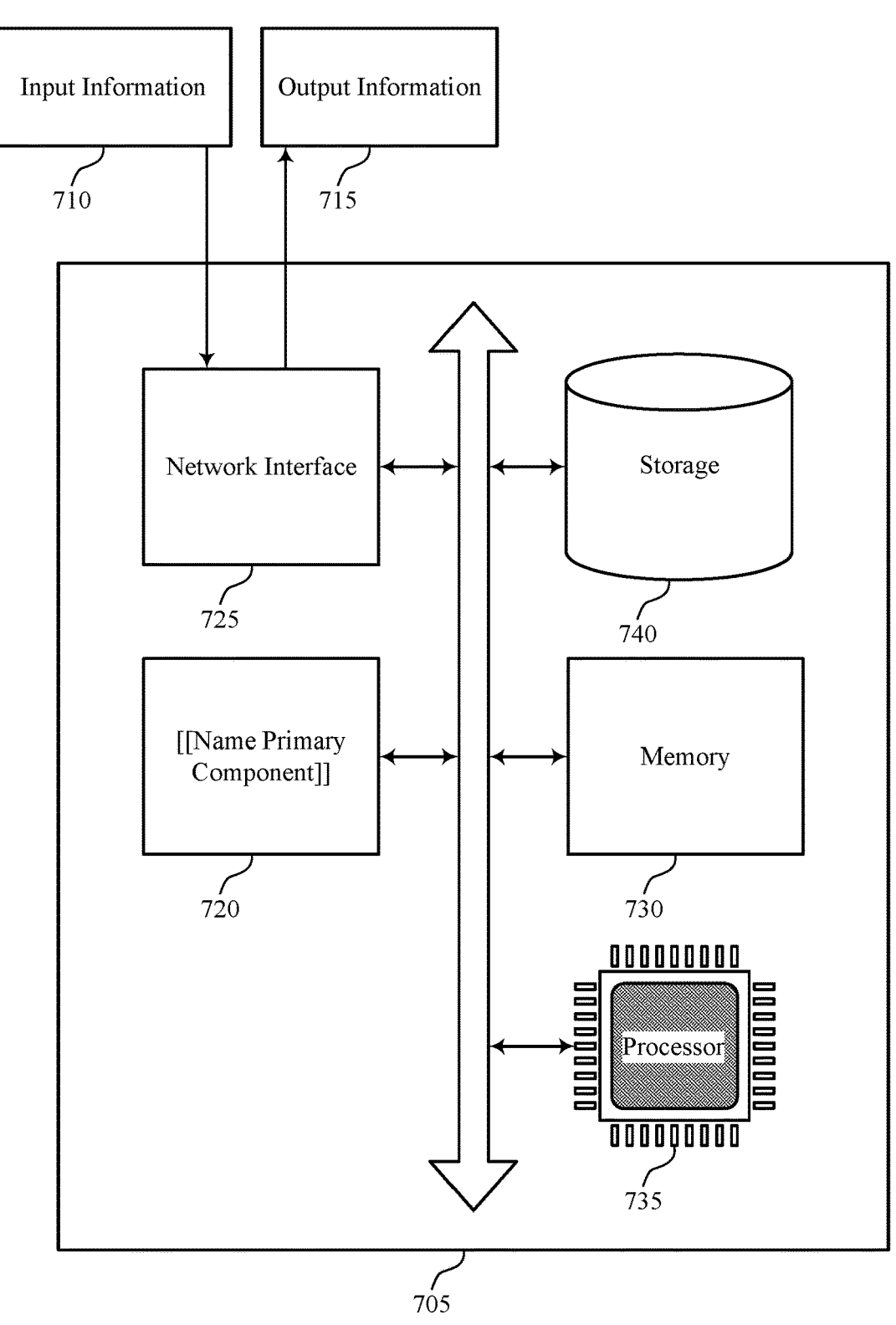
FIG. 7 shows a diagram of a system including a device that supports session timeout using access token refresh in accordance with aspects of the present disclosure.

FIG. 7 shows a block diagram 700 of a system 705 that supports session timeout using access token refresh in accordance with aspects of the present disclosure. The system 705 may be an example of or include the components of a system 505 as described herein. The system 705 may include components for data management, including components such as a session manager 720, an input information 710, an output information 715, a network interface 725, a memory 730, a processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110 or a computing device 115.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting session timeout using access token refresh). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database.

For example, the session manager 720 may be configured as or otherwise support a means for transmitting, to a server, a login request for an application, the login request including one or more authentication parameters associated with a user. The session manager 720 may be configured as or otherwise support a means for receiving, from the server in response to the login request, an access token that supports access via a user interface to one or more services associated with the application before expiration of a time-to-live for the access token. The session manager 720 may be configured as or otherwise support a means for transmitting, prior to expiration of the time-to-live for the access token and based on a session inactivity timeout timer being active, a refresh request for a new access token, the refresh request including an indication of the access token. The session manager 720 may be configured as or otherwise support a means for receiving the new access token in response to the refresh request, where the new access token supports access to the one or more services before expiration of a time-to-live for the new access token.

By including or configuring the session manager 720 in accordance with examples as described herein, the system 705 may support techniques for session timeout using access token refresh, which may provide one or more benefits such as, for example, improved security for service access, such as services supporting data management, among other possibilities.

FIG. 8 shows a flowchart illustrating a method 800 that supports session timeout using access token refresh in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include transmitting, to a server, a login request for an application, the login request including one or more authentication parameters associated with a user. The operations of 805 may be performed in accordance with examples as disclosed herein. In some examples, aspects of the operations of 805 may be performed by a login request component 625 as described with reference to FIG. 6.

At 810, the method may include receiving, from the server in response to the login request, an access token that supports access via a user interface to one or more services associated with the application before expiration of a time-to-live for the access token. The operations of 810 may be performed in accordance with examples as disclosed herein. In some examples, aspects of the operations of 810 may be performed by an initial access token component 630 as described with reference to FIG. 6.

At 815, the method may include transmitting, prior to expiration of the time-to-live for the access token and based on a session inactivity timeout timer being active, a refresh request for a new access token, the refresh request including an indication of the access token. The operations of 815 may be performed in accordance with examples as disclosed herein. In some examples, aspects of the operations of 815 may be performed by an access token refresh component 635 as described with reference to FIG. 6.

At 820, the method may include receiving the new access token in response to the refresh request, where the new access token supports access to the one or more services before expiration of a time-to-live for the new access token. The operations of 820 may be performed in accordance with examples as disclosed herein. In some examples, aspects of the operations of 820 may be performed by an updated access token component 640 as described with reference to FIG. 6.

FIG. 9 shows a flowchart illustrating a method 900 that supports session timeout using access token refresh in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include transmitting, to a server, a login request for an application, the login request including one or more authentication parameters associated with a user. The operations of 905 may be performed in accordance with examples as disclosed herein. In some examples, aspects of the operations of 905 may be performed by a login request component 625 as described with reference to FIG. 6.

At 910, the method may include receiving, from the server in response to the login request, an access token that supports access via a user interface to one or more services associated with the application before expiration of a time-to-live for the access token. The operations of 910 may be performed in accordance with examples as disclosed herein. In some examples, aspects of the operations of 910 may be performed by an initial access token component 630 as described with reference to FIG. 6.

At 915, the method may include initializing, in response to receiving the access token, a session inactivity timeout timer. The operations of 915 may be performed in accordance with examples as disclosed herein. In some examples, aspects of the operations of 915 may be performed by a session inactivity timeout timer component 645 as described with reference to FIG. 6.

At 920, the method may include transmitting, prior to expiration of the time-to-live for the access token and based on the session inactivity timeout timer being active, a refresh request for a new access token, the refresh request including an indication of the access token. The operations of 920 may be performed in accordance with examples as disclosed herein. In some examples, aspects of the operations of 920 may be performed by an access token refresh component 635 as described with reference to FIG. 6.

At 925, the method may include receiving the new access token in response to the refresh request, where the new access token supports access to the one or more services before expiration of a time-to-live for the new access token. The operations of 925 may be performed in accordance with examples as disclosed herein. In some examples, aspects of the operations of 925 may be performed by an updated access token component 640 as described with reference to FIG. 6.

At 930, the method may include detecting expiration of the session inactivity timeout timer. The operations of 930 may be performed in accordance with examples as disclosed herein. In some examples, aspects of the operations of 930 may be performed by a timer expiration component 660 as described with reference to FIG. 6.

At 935, the method may include transmitting, to the server, a logout request that is configured to invalidate the new access token. The operations of 935 may be performed in accordance with examples as disclosed herein. In some examples, aspects of the operations of 935 may be performed by a logout request component 665 as described with reference to FIG. 6.

FIG. 10 shows a flowchart illustrating a method 1000 that supports session timeout using access token refresh in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include transmitting, to a server, a login request for an application, the login request including one or more authentication parameters associated with a user. The operations of 1005 may be performed in accordance with examples as disclosed herein. In some examples, aspects of the operations of 1005 may be performed by a login request component 625 as described with reference to FIG. 6.

At 1010, the method may include receiving, from the server in response to the login request, an access token that supports access via a user interface to one or more services associated with the application before expiration of a time-to-live for the access token. The operations of 1010 may be performed in accordance with examples as disclosed herein. In some examples, aspects of the operations of 1010 may be performed by an initial access token component 630 as described with reference to FIG. 6.

At 1015, the method may include transmitting, prior to expiration of the time-to-live for the access token and based on a session inactivity timeout timer being active, a refresh request for a new access token, the refresh request including an indication of the access token. The operations of 1015 may be performed in accordance with examples as disclosed herein. In some examples, aspects of the operations of 1015 may be performed by an access token refresh component 635 as described with reference to FIG. 6.

At 1020, the method may include receiving the new access token in response to the refresh request, where the new access token supports access to the one or more services before expiration of a time-to-live for the new access token. The operations of 1020 may be performed in accordance with examples as disclosed herein. In some examples, aspects of the operations of 1020 may be performed by an updated access token component 640 as described with reference to FIG. 6.

At 1025, the method may include detecting access to the user interface while the user interface is in an inactive state, where the session inactivity timeout timer is restarted in response to detecting the access. The operations of 1025 may be performed in accordance with examples as disclosed herein. In some examples, aspects of the operations of 1025 may be performed by an access detection component 670 as described with reference to FIG. 6.

At 1030, the method may include transmitting, to the server after the session inactivity timeout timer is restarted and based on the session inactivity timeout timer being active, a data request that includes the new access token. The operations of 1030 may be performed in accordance with examples as disclosed herein. In some examples, aspects of the operations of 1030 may be performed by a data request component 675 as described with reference to FIG. 6.

At 1035, the method may include receiving, in response to the data request, an indication of denial of the data request based on expiration of the time-to-live of the new access token. The operations of 1035 may be performed in accordance with examples as disclosed herein. In some examples, aspects of the operations of 1035 may be performed by an access denial component 680 as described with reference to FIG. 6.

FIG. 11 shows a flowchart illustrating a method 1100 that supports session timeout using access token refresh in accordance with aspects of the present disclosure. The operations of the method 1100 may be implemented by a DMS or its components as described herein. For example, the operations of the method 1100 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1105, the method may include transmitting, to a server, a login request for an application, the login request including one or more authentication parameters associated with a user. The operations of 1105 may be performed in accordance with examples as disclosed herein. In some examples, aspects of the operations of 1105 may be performed by a login request component 625 as described with reference to FIG. 6.

At 1110, the method may include receiving, from the server in response to the login request, an access token that supports access via a user interface to one or more services associated with the application before expiration of a time-to-live for the access token. The operations of 1110 may be performed in accordance with examples as disclosed herein. In some examples, aspects of the operations of 1110 may be performed by an initial access token component 630 as described with reference to FIG. 6.

At 1115, the method may include transmitting, prior to expiration of the time-to-live for the access token and based on a session inactivity timeout timer being active, a refresh request for a new access token, the refresh request including an indication of the access token. The operations of 1115 may be performed in accordance with examples as disclosed herein. In some examples, aspects of the operations of 1115 may be performed by an access token refresh component 635 as described with reference to FIG. 6.

At 1120, the method may include receiving the new access token in response to the refresh request, where the new access token supports access to the one or more services before expiration of a time-to-live for the new access token. The operations of 1120 may be performed in accordance with examples as disclosed herein. In some examples, aspects of the operations of 1120 may be performed by an updated access token component 640 as described with reference to FIG. 6.

At 1125, the method may include detecting access to the user interface while the user interface is in an inactive state, where the session inactivity timeout timer is restarted in response to detecting the access. The operations of 1125 may be performed in accordance with examples as disclosed herein. In some examples, aspects of the operations of 1125 may be performed by an access detection component 670 as described with reference to FIG. 6.

At 1130, the method may include transmitting, to the server after the session inactivity timeout timer is restarted and based on the session inactivity timeout timer being active, a data request that includes the new access token. The operations of 1130 may be performed in accordance with examples as disclosed herein. In some examples, aspects of the operations of 1130 may be performed by a data request component 675 as described with reference to FIG. 6.

At 1135, the method may include receiving, in response to the data request, requested data, where the requested data is received based on the data request being transmitted before expiration of the time-to-live of the new access token. The operations of 1135 may be performed in accordance with examples as disclosed herein. In some examples, aspects of the operations of 1135 may be performed by a data request component 675 as described with reference to FIG. 6.

A method is described. The method may include transmitting, to a server, a login request for an application, the login request including one or more authentication parameters associated with a user, receiving, from the server in response to the login request, an access token that supports access via a user interface to one or more services associated with the application before expiration of a time-to-live for the access token, transmitting, prior to expiration of the time-to-live for the access token and based on a session inactivity timeout timer being active, a refresh request for a new access token, the refresh request including an indication of the access token, and receiving the new access token in response to the refresh request, where the new access token supports access to the one or more services before expiration of a time-to-live for the new access token.

An apparatus is described. The apparatus may include a processor, memory coupled with the processor, and instructions stored in the memory. The instructions may be executable by the processor to cause the apparatus to transmit, to a server, a login request for an application, the login request including one or more authentication parameters associated with a user, receive, from the server in response to the login request, an access token that supports access via a user interface to one or more services associated with the application before expiration of a time-to-live for the access token, transmit, prior to expiration of the time-to-live for the access token and based on a session inactivity timeout timer being active, a refresh request for a new access token, the refresh request including an indication of the access token, and receive the new access token in response to the refresh request, where the new access token supports access to the one or more services before expiration of a time-to-live for the new access token.

Another apparatus is described. The apparatus may include means for transmitting, to a server, a login request for an application, the login request including one or more authentication parameters associated with a user, means for receiving, from the server in response to the login request, an access token that supports access via a user interface to one or more services associated with the application before expiration of a time-to-live for the access token, means for transmitting, prior to expiration of the time-to-live for the access token and based on a session inactivity timeout timer being active, a refresh request for a new access token, the refresh request including an indication of the access token, and means for receiving the new access token in response to the refresh request, where the new access token supports access to the one or more services before expiration of a time-to-live for the new access token.

A non-transitory computer-readable medium storing code is described. The code may include instructions executable by a processor to transmit, to a server, a login request for an application, the login request including one or more authentication parameters associated with a user, receive, from the server in response to the login request, an access token that supports access via a user interface to one or more services associated with the application before expiration of a time-to-live for the access token, transmit, prior to expiration of the time-to-live for the access token and based on a session inactivity timeout timer being active, a refresh request for a new access token, the refresh request including an indication of the access token, and receive the new access token in response to the refresh request, where the new access token supports access to the one or more services before expiration of a time-to-live for the new access token.

Some examples of the method, apparatuses, and non-transitory computer-readable medium described herein may further include operations, features, means, or instructions for initializing, in response to receiving the access token, the session inactivity timeout timer.

Some examples of the method, apparatuses, and non-transitory computer-readable medium described herein may further include operations, features, means, or instructions for detecting an action by a peripheral device in association with the user interface of the application and restarting the session inactivity timeout timer in response to detecting the action.

In some examples of the method, apparatuses, and non-transitory computer-readable medium described herein, the session inactivity timeout timer may be initialized with a same duration as the time-to-live for the access token.

Some examples of the method, apparatuses, and non-transitory computer-readable medium described herein may further include operations, features, means, or instructions for detecting expiration of the session inactivity timeout timer and transmitting, to the server, a logout request that may be configured to invalidate the new access token.

Some examples of the method, apparatuses, and non-transitory computer-readable medium described herein may further include operations, features, means, or instructions for detecting access to the user interface while the user interface may be in an inactive state, where the session inactivity timeout timer may be restarted in response to detecting the access, transmitting, to the server after the session inactivity timeout timer may be restarted and based on the session inactivity timeout timer being active, a data request that includes the new access token, and receiving, in response to the data request, an indication of denial of the data request based on expiration of the time-to-live of the new access token.

In some examples of the method, apparatuses, and non-transitory computer-readable medium described herein, the user interface may be in the inactive state when the access is detected based on the application being closed, a tab displaying the user interface being closed, or any combination thereof.

Some examples of the method, apparatuses, and non-transitory computer-readable medium described herein may further include operations, features, means, or instructions for detecting access to the user interface while the user interface may be in an inactive state, where the session inactivity timeout timer may be restarted in response to detecting the access, transmitting, to the server after the session inactivity timeout timer may be restarted and based on the session inactivity timeout timer being active, a data request that includes the new access token, and receiving, in response to the data request, requested data, where the requested data may be received based on the data request being transmitted before expiration of the time-to-live of the new access token.

In some examples of the method, apparatuses, and non-transitory computer-readable medium described herein, the server may be associated with a data management service that may be configured to manage backup of one or more data sources associated with the data management service, and the time-to-live of the access token may be associated with a service level agreement for the data management service.

Some examples of the method, apparatuses, and non-transitory computer-readable medium described herein may further include operations, features, means, or instructions for transmitting an additional refresh request for a subsequent access token and for receiving, in response to the additional refresh request, an indication of denial of the additional refresh request based on a duration of a session period exceeding a maximum duration threshold.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
transmitting, to a server, a login request for an application, the login request comprising one or more authentication parameters associated with a user;
receiving, from the server in response to the login request, an access token that supports access via a user interface to one or more services associated with the application before expiration of a time-to-live for the access token;
initializing, by the application in response to receiving the access token, a session inactivity timeout timer with a same duration as the time-to-live for the access token, wherein the application is configured to restart the session inactivity timeout timer in response to detection of an action by the user at the application;
transmitting, based at least in part on the time-to-live for the access token reaching a threshold time-to-live while the session inactivity timeout timer is active, a refresh request for a new access token, the refresh request including an indication of the access token; and
receiving the new access token in response to the refresh request, wherein the new access token supports access to the one or more services before expiration of a respective time-to-live for the new access token.

2. The method of claim 1, further comprising:
detecting the action by a peripheral device in association with the user interface of the application; and
restarting the session inactivity timeout timer in response to detecting the action.

3. The method of claim 1, further comprising:
detecting expiration of the session inactivity timeout timer; and
transmitting, to the server, a logout request that is configured to invalidate the new access token.

4. The method of claim 1, further comprising:
detecting access to the user interface while the user interface is in an inactive state, wherein the session inactivity timeout timer is restarted in response to detecting the access;
transmitting, to the server after the session inactivity timeout timer is restarted and based at least in part on the session inactivity timeout timer being active, a data request that includes the new access token; and
receiving, in response to the data request, an indication of denial of the data request based at least in part on expiration of the time-to-live of the new access token.

5. The method of claim 4, wherein the user interface is in the inactive state when the access is detected based at least in part on the application being closed, a tab displaying the user interface being closed, or any combination thereof.

6. The method of claim 1, further comprising:
detecting access to the user interface while the user interface is in an inactive state, wherein the session inactivity timeout timer is restarted in response to detecting the access;
transmitting, to the server after the session inactivity timeout timer is restarted and based at least in part on the session inactivity timeout timer being active, a data request that includes the new access token; and
receiving, in response to the data request, requested data, wherein the requested data is received based at least in part on the data request being transmitted before expiration of the time-to-live of the new access token.

7. The method of claim 1, wherein:
the server is associated with a data management service that is configured to manage backup of one or more data sources associated with the data management service; and
the time-to-live of the access token is associated with a service level agreement for the data management service.

8. The method of claim 1, further comprising:
transmitting an additional refresh request for a subsequent access token; and
receiving, in response to the additional refresh request, an indication of denial of the additional refresh request based at least in part on a duration of a session period exceeding a maximum duration threshold.

9. An apparatus, comprising:
one or more processors;
memory coupled with the one or more processors; and
instructions stored in the memory and executable by the one or more processors to cause the apparatus to:
transmit, to a server, a login request for an application, the login request comprising one or more authentication parameters associated with a user;
receive, from the server in response to the login request, an access token that supports access via a user interface to one or more services associated with the application before expiration of a time-to-live for the access token;

initialize, by the application in response to receiving the access token, a session inactivity timeout timer with a same duration as the time-to-live for the access token, wherein the application is configured to restart the session inactivity timeout timer in response to detection of an action by the user at the application;

transmit, based at least in part on the time-to-live for the access token reaching a threshold time-to-live while the session inactivity timeout timer is active, a refresh request for a new access token, the refresh request including an indication of the access token; and receive the new access token in response to the refresh request, wherein the new access token supports access to the one or more services before expiration of respective a time-to-live for the new access token.

10. The apparatus of claim 9, wherein the instructions are further executable by the one or more processors to cause the apparatus to:

detect the action by a peripheral device in association with the user interface of the application; and restart the session inactivity timeout timer in response to detecting the action.

11. The apparatus of claim 9, wherein the instructions are further executable by the one or more processors to cause the apparatus to:

detect expiration of the session inactivity timeout timer; and transmit, to the server, a logout request that is configured to invalidate the new access token.

12. A non-transitory computer-readable medium storing code, the code comprising instructions executable by one or more processors to:

transmit, to a server, a login request for an application, the login request comprising one or more authentication parameters associated with a user;

receive, from the server in response to the login request, an access token that supports access via a user interface to one or more services associated with the application before expiration of a time-to-live for the access token;

initialize, by the application in response to receiving the access token, a session inactivity timeout timer with a same duration as the time-to-live for the access token, wherein the application is configured to restart the session inactivity timeout timer in response to detection of an action by the user at the application;

transmit, based at least in part on the time-to-live for the access token reaching a threshold time-to-live while the session inactivity timeout timer is active, a refresh request for a new access token, the refresh request including an indication of the access token; and receive the new access token in response to the refresh request, wherein the new access token supports access to the one or more services before expiration of a respective time-to-live for the new access token.

13. The non-transitory computer-readable medium of claim 12, wherein the instructions are further executable by the one or more processors to:

detect the action by a peripheral device in association with the user interface of the application; and restart the session inactivity timeout timer in response to detecting the action.

14. The non-transitory computer-readable medium of claim 12, wherein the instructions are further executable by the one or more processors to:

detect expiration of the session inactivity timeout timer; and transmit, to the server, a logout request that is configured to invalidate the new access token.

* * * * *